2,807,725

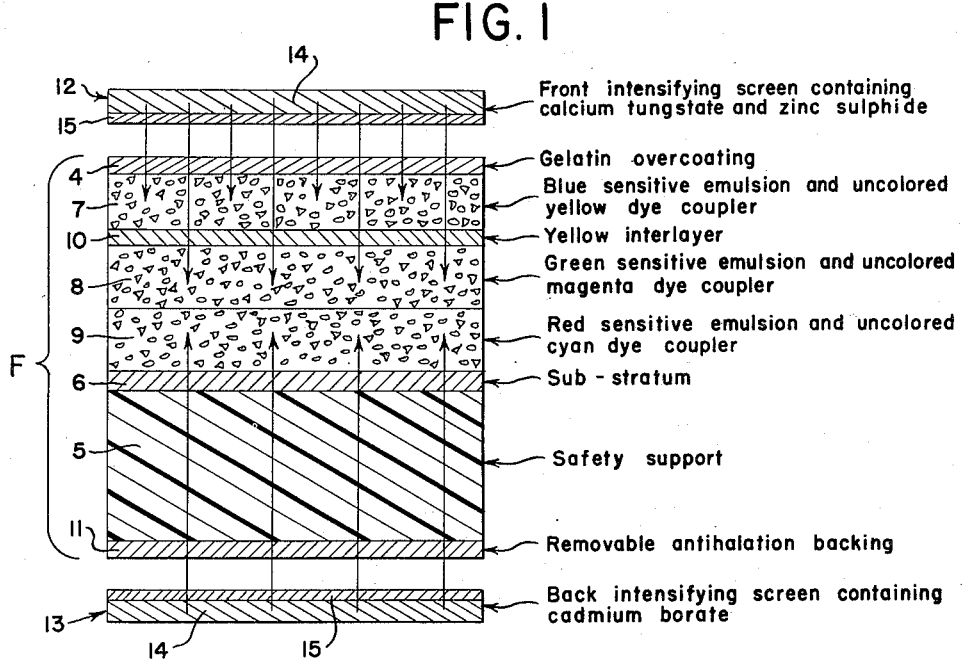
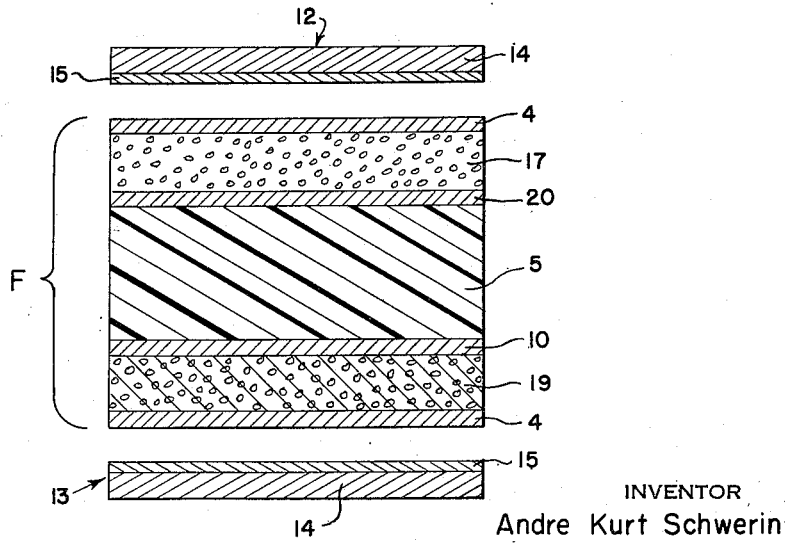
INVENTOR
Andre Kurt Schwerin

COLOR RADIOGRAPHY PROCESS

Andre Kurt Schwerin, Montreal, Quebec, Canada, assignor to Gerard Lemeac-Vigneau, Montreal, Quebec, Canada, in trust Application January 27, 1954, Serial No. 406,546

4 Claims. (Cl. 250—65)

The present invention relates to the art of radiography and, more particularly, an improvement consisting in the production of color radiography, wherein colors are obtained as a direct function of the absorbed X-rays or similar invisible radiations by the substances radiographed.

Radiography, as currently practiced, is an old art requiring skill and experience for correctly interpreting, on a photographic film generally, the various density markings corresponding to the absorption of the X-rays penetrating the objects radiographed.

At best, this absorption is slight because, of their very nature, X-rays are very penetrating and, unless dense metals are dealt with, they pass through matter with little absorption. Therefore, although sensitized photographic materials are somewhat sensitive to X-rays and receive a weak developable impressions therefrom, the slight absorption of the X-rays through an object cause relatively small density differentiations to appear on such photographic materials used for radiography. In other words, their contrast and sensitivity is said to be low.

For raising the contrast and sensitivity, it has been the usual practice to utilize so-called "intensifying screens" between which an X-ray film is sandwiched, said screens consisting of a light-opaque support or backing sheet coated with a compound adapted to fluoresce when activated by impinged X-rays, said fluorescence, in turn, actinically affecting the X-ray film, thereby superimposing this visible light effect over the weak X-ray exposure. This constitutes a reenforcement of the X-ray image on the film, with consequent increased density and contrast.

So far, as reviewed above, radiography has always been a monochromatic rendition because the X-rays are situated outside the visible range of the light spectrum and, obviously, said rays cannot be chromatically affected by the coloration of objects being radiographed. For that reason, black and white, or monochromatic, film has been used for X-rays, preferably with intensifying screens emitting a radiation to which X-ray films are sensitive.

Such intensifying screens have been universally used for ordinary radiography and consist of fiber or plastic sheets coated for instance with finely divided calcium tungstate dispersed in a suitable medium. When activated by X-rays such a screen emits an ultra violet and bluish radiation, X-ray monochromatic films being particularly sensitized to this radiation.

Obviously, so-called color films could be used for radiography since their emulsions are also slightly sensitive to X-rays. There is no advantage in doing so, however, because said films are very expensive, the sensitivity is very low and the processing is more involved than ordinary monochromatic X-ray plates and films.

As a matter of fact, the use of commercial color film in radiography has already been suggested in United States Patent No. 2,644,096 to B. N. Fine. According to this suggestion a suitable color film is sandwiched between intensifying screens as used in black-and-white radiography and exposed to X-rays, as usual. The intensifying screens can be omitted also, if desired.

The above method has the disadvantage, however, of producing weak radiographs under normally applicable conditions, unless intensifying screens are used, in which case the color obtained is mostly the monochromatic rendering of the fluorescence given off by the screens. Furthermore, the colors obtainable on the film are spectrally closely adjacent and cannot be predicted accurately in advance, said colors being the end result of such variable factors as the energizing voltage of the X-ray tube, the types of films used, cassettes employed, etc.

Therefore, the simple use of a color film for radiography, instead of the monochromatic, conventional, X-ray film is not conducive to the attainment of radiographs in which the hues and brightness thereof are in direct ratio to the ray absorption by the material or substances radiographed. For the reason already given this applies even more forcibly when such color films are used with intensifying screens as described in the mentioned patent.

Other attempts have been made to obtain directly color radiographs by means of special multi-layer emulsion films of known structure. For said films the suggestion has been made of dispersing, in the various emulsions of the pack, heavy compounds intended to absorb selectively X-rays and other radiations, thus producing in situ fluorescences which would be absorbed selectively by one or more of the film layers. Unfortunately, however, such special films have been found impractical because, at best, the dispersed compounds could not be used in sufficiently great concentration to represent adequate absorption or, conversely, their very presence in the emulsion caused inherent difficulties such as fogging, reduced sensitivity and so on, thus complicating the processing of such a film.

As recognized already, the rendition of X-rays and other invisible radiations on a color film, in clearly differentiated, bright, highly saturated colors is a very desirable objective. As it is well known, the human eye is readily aware of differences in colors, or hues; conversely, the eye is not easily capable of differentiating between the tones of a grey scale, such as a black and white radiograph.

It is this attribute of the human eye which renders color radiographs so interesting; whereas a color radiograph can clearly indicate to an observer delicately modulated color differences, a grey-tone radiograph of the same subject would require greatly increased density contrasts for comparable visual perception.

The present invention has been conceived to avoid the difficulties, drawbacks and disadvantages noted above in the processes so far suggested for color radiography. Its main objective, therefore, resides in the provision of a process and means therefore whereby improved radiographs in color may be obtained efficiently, said radiographs displaying color ranges and scales in a direct ratio to the absorption of X-rays and other invisible radiations by the matter of being radiographed.

An important object of the invention is the provision of a process of the character described, which process is simple, standardizable and relatively inexpensive of performance.

A further object concerns a process and means therefor whereby color radiographs can be obtained easily, under standardized conditions, by relatively inexperienced and unskilled operators.

Still another object envisages a process of the character described applicable to any color film currently marketed and with which color radiographs having high color differentiation or spread can be readily obtained.

Other objects and advantages of the invention will become apparent, or be described further during the description to follow.

For the purpose of this specification and claims, the expression "color film" is meant to indicate any kind of known and commercially available sensitized photographic material adapted to reproduce colors of the visible spectrum, whether such material (usually on a film base) be of the additive or subtractive color-forming synthesis. Preference should be given to a film based on subtractive synthesis presenting a multi-layer structure and producing colors by dye-coupling processing. This kind of film and its processing is already known to those skilled in the art of color photography. Finally, for reasons of simpler processing a negative color film is preferable to a reversal film.

Such films are already on the market. One of them is known under the trade name of "Ektacolor print film": it is an Eastman Kodak product. Obviously, other equally excellent films are also available, the mention of Ektacolor print film being a specific example only.

This film is composed of 3 superimposed emulsions, each sensitized to a different wave band of the visible spectrum. The top layer is sensitized to blue light, producing after development a yellow dye; the middle layer is sensitized to green light and produces a magenta dye while the bottom layer is sensitized to receive red light for producing a cyan dye. A light yellowish filter coating between the top and middle layers completes the absorption of residual blue radiations.

If such a film is now exposed through a medium, or object, presenting different absorption characteristics to X-rays or other invisible radiations and developed in a well known manner, this exposure will produce a monochrome color radiograph.

This radiograph will be produced by the relatively weak absorption of the X-rays, or invisible radiations, by the film emulsion and, obviously, will be a function of the exposure received by each layer and their respective sensitivity. Thus, the color obtained will be a mixture of the hues produced by:
1. Top layer: yellow.
2. Middle layer: magenta (red-violet).
3. Bottom layer: cyan (blue-green).

Evidently, such a mixture of colors will tend to be greyish, although more pronounced absorption of X-rays or other radiations by one specific layer of the film would tend to favor the final color produced by said layer. Consequently, as is often the case, the top layer may absorb more radiations and, therefore, it is more completely exposed: the result is a yellow or greenish cast imparted to a radiograph obtained under the conditions above noted.

Extensive experiments have shown conclusively that a detailed color differentiation, in relation to the absorption characteristics of the medium radiographed, is not possible. This will be readily appreciated if it is considered that, in a color film, the final color obtained is a direct function of the exposure received by each color-producing element of the film, whatever its construction or operating principle.

Thus, any color film being permeable to X-rays and other penetrating invisible rays, it is clear that, theoretically at least, all three color-producing elements of the film will be similarly exposed, producing a mixed greyish color. In practice, however, it has been found that one element, or layer, may absorb more or less radiations, thereby creating an unbalance favoring one color and producing a monochrome colored radiograph. But, at best, this is liable to vary from batch to batch of the film used, or from one make to another, so that absorption standardization by means of colors is out of the question, when proceeding as above described.

By sandwiching a color film between two intensifying screens above noted, a two-color radiograph may be obtained, depending on the characteristics of both the film and the screens. Obviously, X-rays and other radiations, after passage through the film and screens, produce not only the color inherent to the film absorption but, also, the color corresponding to the fluorescent light emitted by the screens and caused by their absorption of the invisible radiations.

However, by the prior techniques no accurate relationship can be predetermined, between the colors obtained as above noted, and the absorption characteristics of the material radiographed. Furthermore, and quite important, the formation of a very limited number of basic colors can be predicted or actually obtained, all said colors being close neighbors in the color spectrum, for obvious reasons. For instance, the following series are generally the most common:
1. Green, yellowish-green, yellow, or
2. Blue, reddish-blue, red.

The present invention is an improvement over the processes described above, the invention embodying a modus operandi enabling the formation of a wide scale of different basic colors with their intermediate half tones, the hue and saturation of each color being related directly to the X-ray beam intensity, after its passage through an absorbent medium. The net result is the possible exact interpretation of this medium absorption characteristics.

Briefly stated, this result is obtained by a suitable choice and placement of novel intensifying screens used in conjunction with a negative, or positive, color film of usual construction.

Said screens consist of fibre-board, plastic or other opaque sheeting provided on one side with a coating of a suitable fluorescing compound, or compounds, dispersed in an appropriate medium, in accordance with the well-known techniques of photographic plate coating, ordinary X-ray intensifying screens and the like.

The following fluorescent compounds are suitable:

| Peak emission | | Color Produced | |
| --- | --- | --- | --- |
| | | Negative Film | Positive Film |
| 1. Calcium Tungstate | blue | yellow | blue. |
| 2. Zinc Cadmium Sulphide | green | red | green. |
| 3. Cadmium Borate | red | blue | red. |

Other compounds, preferably of fine grain size and showing no or little afterglow may be substituted. Screens may be used, on which one or several of the above compounds may be coated, as described above. The front and the back screens, of equal or unequal thickness, may contain the same mixture of compounds, or the mixture may be different (qualitatively or quantitatively) for the two screens or, by preference, the top screen may contain two compounds in a given relation and the back screen only one compound. More than 3 compounds may be used, if desired.

*Example 1*

Front screen: Mixture of 3 parts of calcium tungstate and 2 parts of zinc sulphide
Back screen: 1 part of cadmium borate These fluorescent compounds are, after grinding, dissolved in a suitable solvent, for instance a mixture of equal parts of polyvinylic alcohol and toluol and then applied to well known means, on a suitable base (for instance a fiber or plastic base). In accordance with already adopted practices, the application may be done mechanically by spraying, floating or roller spreading.

The said compounds, of fluorescigenic character under activation by X-rays and other invisible radiations, may be called "phosphors" and this term will now be used for simplification.

The quantities of the individual powders constituting the phosphors, that is: their degree of response to invisible radiation, should be taken into consideration, as well as the special color sensitivity of each layer of the color film to be used with particular phosphors. Thus, by preselecting the characteristics of the various phosphors the relative sensitivities of the different emulsions are effectively spread apart and a greater color gamut obtained from a given exposure.

This, of course, is to obtain the following result: that weak intensities of radiation should excite the phosphor having the highest sensitivity or, more properly speaking, the greatest response to radiations as a function of fluorescent light emission. Furthermore, the middle intensities of radiation should cause light emission from the phosphor presenting high and intermediate response, while the high intensities of radiation should, naturally, affect all phosphors, causing light emission from them all.

Therefore different intensities of X-rays produce different quantities of fluorescent light of various spectral composition. These fluorescent lights then produce different colors in the color film, the produced colors (hue and saturation) depending directly on the remaining intensities of the X-rays after their passage through an absorbent medium.

In the above example the front screen produces blue and green lights, showing therefore on a negative color film as yellow and red colors, the back screen produces red light, causing on that same negative color film the formation of a blue dye. To obtain a detailed color differentiation by the above described process, two alternatives for making up of the front and back screens may be considered:

(1) The various phosphors (the 3 noted above) may present the same sensitivity or response to the incident X-ray radiation.

In such a case, their respective amount in the screens may be arranged in such a way that, for instance, the front screen may contain three times more of the first phosphor and twice more of the second phosphor than the quantity of the third phosphor in the back screen. Of course, "first," "second" and "third" (or A, B, C) is meant to indicate the response to X-rays, such as given above, that is: the "first" phosphor is the one more susceptible to weak intensities of radiation, or having the highest response. The "second" phosphor reacts to intermediate intensities, and so on.

*Example 2*

Front screen (cardboard 5–7 inches), coated with a mixture of:
    9 g. phosphor A (blue emitting) (calcium tungstate)
    6 g. phosphor B (green emitting) (zinc sulphide)
Back screen (cardboard 5–7 inches), coated with: 3 g. phosphor C (red emitting) (cadmium borate)

In practice it is difficult, if not impossible, to find suitable phosphor compounds of equal response; consequently, preference should be given to the second alternative:

(2) The phosphors have a different response to equal intensities of radiation.

In such a case, the quantities of phosphors have to be chosen so that equal radiation intensities produce fluorescent intensities in a predetermined quantitative relation, the said quantities to be related also to the different sensitivities of the various emulsion layers. Practically, the required conditions of alternative 2 are more easily realized.

*Example 3*

Front screen:
    9 g. of calcium tungstate
    2.5 g. of zinc cadmium sulphide
Back screen: 19.8 g. of cadmium borate Now, if a color film be sandwiched between a pair of the above described screens and exposed to X-rays, or other invisible radiations passed through a medium presenting X-ray absorption characteristics, a very detailed color differentiation is obtained on said film, after development thereof in the manner prescribed for the particular film used.

The range of colors so obtained includes complementary colors and will reach from a dark blue through violet, red-orange to yellow, in relation to the decreasing intensity of the invisible radiations after their passage through, and absorption by, a medium having variable absorption of said radiations.

Therefore, high intensities of X-rays, for instance, will excite all three phosphors, to produce a mixed color resulting from the three differently-colored fluorescent lights; medium intensities will excite two phosphors only, with the resultant color a mixture of the two lights so produced. Finally, weak X-ray intensities will be effective on the one phosphor having the highest response only, thereby forming one dye only. Since the screens are disposed on both sides of the color film, for taking colored radiographs according to the invention, each screen should be placed, with respect to said film, so that the dominant light emitted by each screen is adapted to expose the adjacent film layer sensitized to this color. In other words, the blue-green screen (the screen having calcium tungstate and zinc sulphide) should be placed immediately adjacent the blue-sensitized layer of the film: generally the top layer in a color film of multi-layer construction. The red-emitting screen (containing cadmium borate) is placed at the bottom of the film near the red-sensitized emulsion.

*Example 4*

Front screen consisting of:                      Response
    A—calcium tungstate_____ High.
    B—zinc sulphide_____ Intermediate.
Back screen: C—cadmium borate_____ Low.

Thus, weak X-ray intensities act mostly on the calcium tungstate of the front or top screen producing:

| Negative Color Film | Positive Color Film |
| --- | --- |
| Yellow | Blue. |

Likewise, the intermediate intensities activating the calcium tungstate and zinc sulphide of the front screen produce:

| Negative Color Film | Positive Color Film |
| --- | --- |
| Yellow and Red. (Orange) | Blue and Green. (Blue-Green). |

The high intensities of radiation acting on the two phosphors of the front screen and the phosphor of the back screen produce:

| Negative Color Film | Positive Color Film |
| --- | --- |
| Yellow, Red and Blue. (Violet) | Blue, Green and Red. (Brown-Black). |

Generally, the colors obtained will vary in accordance with the specific phosphors chosen and the chromatic sensitivity of the different emulsion layers.

Furthermore, in the examples given above, for the front screen, it has been found that the green light component, namely: the zinc sulphide, can be greatly improved in intensity and spectral definition by the addition of cadmium sulphide in the proportion of approximately 1 to 3, that is: ZnS—6, CdS—2. Traces of silver, up to 1% act as an activator.

In order to illustrate the considerations above noted, a schematic drawing of embodiments of the invention is annexed wherein:

Figure 1 shows in diagrammatic, greatly enlarged form, a multi-layer film of the type described used in association with the screens also described, both screens and film being shown in section, and Figure 2 is a similar view of a film that may be made especially for use according to the present invention, in conjunction with front and back screens also.

In this drawing, wherein similar reference characters represent corresponding parts throughout, the letter F designates the film, as a whole, said film consisting of a base or support 5, preferably of the so-called "safe" type, which support is coated with several emulsion layers over a sub-stratum 6. In the case of Figure 1, the film has the three layers 7—8—9 sensitized, respectively, to blue, green and red light yielding, after color development, yellow, magenta and cyan dyes. As shown, a yellow colored interlayer, or filter 10, disposed between the emulsions 7 and 8, serves to absorb blue light and prevent the same from affecting layers 8 and 9.

Although an anti-halation layer as present on all modern films has been shown at 11, it is better that it be removed, or made removable. The gelatine overlayer 4 is a desirable feature.

The screens 12—13, front and back, consist of a support 14 coated, as previously described, with a suitable coating 15 of a phosphor, or a mixture of phosphors properly chosen to emit a light of a given color. Thus, the front screen 12 might be made to emit blue and blue-green light, while the back screen could be calculated to emit red-orange light only, for reasons already given.

Thus, under the activation of invisible radiations, the film F is adapted to be exposed from both sides, by the fluorescence given off by the screens.

Figure 2 illustrates an embodiment of a color film of simplified construction, conceived with the present invention in view and, accordingly, more economical for radiography than conventional color films.

Such a simplified film would have two emulsions only, one on each face of the safety support 5, each emulsion being sensitized and carrying dye coupler elements balanced for a two-color system. Several systems of two-color photography are already well known and have been found capable of producing reasonably accurate reproduction of colors.

Since, in color radiography fidelity of color reproduction is not a requirement, the two-color system is well capable of giving excellent results and, for this purpose, might well prove to be an ideal, simple and economical medium.

As shown in Figure 2, the support 5 has an upper emulsion layer 17 disposed over the dyed sub-stratum 20 acting as a yellow filter for absorbing blue light from the front screen 12. This layer 17 would include uncolored dye couplers calculated to form a greenish dye, for example, after suitable development.

The under layer 19, coated over the sub-stratum 10, is disposed on the other face of the support 5, said layer having also an anti-abrasion overcoating 4. This under layer 19 is sensitized to red, or orange-red, and comprising dye couplers calculated to form in situ a magenta to violet dye whereby, in combination with the dye of the front or upper layer 17, a reasonably wide range of colors could be obtained to fulfill the main objective of the invention.

Obviously, such a two-color film could be manufactured relatively cheaply and provided with special emulsions for the specific objects in view.

The same principle would apply also to a three-layer film, such as shown in Figure 1, wherein the yellow and magenta dye-coupled layers 7—8 could be on the upper face of the support and the cyan layer 9 on the other back face.

Conversely, in the case of monopack films, that is: a film having one emulsion layer only in which tri-color elements are uniformly dispersed, the screens could be used on both sides and, even, in combination with such a tri-color-elements emulsion on both faces of the support.

From the foregoing it will be seen that the range of colors obtained according to the invention is quite extensive, reaching in a negative color film from yellow-orange to red-violet and dark blue and, in a positive color film from blue to green and brown.

As indicated in a previous paragraph, the characteristic of the invention consisting in the placement of the screens about the film, in accordance with the light emitted, rather than mixing up all phosphors in one screen, results in having distinct color bands selectively affecting the sensitized layers of a multi-layer film. This avoids the mixing of colors towards a greyish tone, or the neutralization of primary by complementary hues.

As screens are placed on both sides of a color film, it is a desirable requirement that so-called anti-halation layers be dispensed with, or removed, from the base of said film, so as not to impede the light transmission from the back screen.

Summing up, therefore, the present invention resides in the provision of a method for obtaining color radiographs having an extended range of colors and, more specifically, a color differentiation which can be predetermined in correspondance with the absorption of a body towards X-rays and other invisible radiations.

The invention is practiced by sandwiching a commercially available color film (preferably of the negative, substractive multi-layer structure) between a pair of screens, said screens consisting of cardboard, pasteboard, plastic or other material sheeting permeable to invisible radiations such as X-rays but opaque to visible light.

One face of said screens is coated with a layer of a so-called "phosphor" dispersed, in a finely divided state, within a varnish-like vehicle.

The said phosphors are novel in that they glow under the action of X-rays and the like radiations, this glow or fluorescence having a distinct color which may be closely assimilated to the primary colors of the spectrum.

Therefore, by coating separate screens with phosphor combinations emitting light of distinct colors and suitably placing said screens about the film in accordance with the color of their light viz., so that the light emitted by each screen is predominantly of the same color as that to which the adjacent film emulsion is sensitized, as represented in Fig. 1, said light may be made to expose layers, or parts, of the film more susceptible thereto. The result is a clear and sharp differentiation between the colored lights emitted by the screens.

Also, by a suitable choice of the quantities of a phosphor, or phosphors, color differentiation having a predetermined response in relation to the chromatic sensitivity of the different layers of the film emulsion, can be obtained as a function of the radiation intensities or, conversely, of their absorption by a given body being radiographed.

Since phosphors may be made selectively responsive to radiation intensity, the resultant color ranges obtained on a color film can be correlated accurately in relation to the amount of radiation to which the film has been exposed.

As a last example of particularly successful phosphor coatings on screens five by seven inches in size, the following is additionally given:

Front or top screen:                                      Grams
   Hexagonal zinc sulphide and traces of colloidal
     metallic silver_____ 20
   Rhomboidal zinc silicate and traces of manganese metal_____ 7.5

The above is finely powdered, intimately mixed and dispersed in a varnish medium consisting of commercially available so-called "clear white lacquer." This lacquer acts as a spreading medium only and may consist of cellulose acetate dissolved in acetone, amyl acetate and other suitable organic solvents. In any case, such lacquers are well known and easily available; they dry rapidly, leaving a solid film in which the phosphor particles are embedded and sealed. They must be of neutral color, for obvious reasons.

The fluorescent color of a screen as above is a mixture of blue and green light, the zinc sulphide having a blue fluorescence and the zinc silicate a green one.

Back screen: Grams
 Cadmium borate, powdered, and traces of manganese metal_____ 12.5

The color of this phosphor is orange and its grinding and dispersion in a clear white lacquer is the same as above given.

It may be pointed out that the small quantities of colloidal silver and manganese metals given in the formulae noted immediately above amount to traces only, said metals acting as activators for the phosphors not unlike catalysts in other chemical processes and formulations.

With the screens disposed as described, with respect to the color sensitization of the various layers of a color film, excellent results are obtained with the activated phosphors above.

Finally, it is obvious that the principle involved in the present invention, can be applied to cognate fields of radiography, such as: stereoradiography, cineradiography, and various devices of fluoroscopic technique, especially the applications thereof using methods of electronic amplification.

It must be understood that, during the text and claims, the expression: "X-rays and other invisible radiations" is meant to indicate alpha, beta, gamma, X-rays and neutrons etc. and that various changes in the exact procedure of the invention can be resorted to without departing from the spirit of the invention or the scope of the subjoined claims.

What I claim is:

1. In combination with a photographic color film of the type having a plurality of emulsion layers superposed on a film base, each emulsion layer producing a different color, a pair of intensifying screens of the phosphor type disposed respectively in juxtaposition to the front and back of said film, the phosphors of said screens having different color characteristics selected such that the light emitted by each screen is predominantly of the same color as that to which the nearest adjacent film emulsion is sensitized.

2. A photographic color film of the type having three emulsion layers superposed on a film base, each emulsion being adapted to produce a different color and being of least, greatest and intermediate sensitivity, respectively, in combination with a pair of intensifying screens of the phosphor type disposed one on each side of said film, the phosphors of said screens being selected as to the relative amounts of light emitted in response to a given exposure such that with respect to said emulsion of intermediate sensitivity the sensitivity of the least sensitive emulsion is effectively decreased and the sensitivity of the most sensitive emulsion is effectively increased.

3. A photographic color film of the type having three emulsion layers superposed on a film base, each emulsion being adapted to produce a different color and being of least, greatest and intermediate sensitivity, respectively, in combination with a pair of intensifying screens of the phosphor type disposed one on each side of said film, the phosphors of said screens having respectively different color characteristics selected such that the light emitted by each screen is predominantly of the same color as that to which the nearest adjacent film emulsion is sensitized, and being selected as to the relative amounts of light emitted in response to a given exposure such that with respect to said emulsions of intermediate sensitivity the sensitivity of the least sensitive emulsion is effectively decreased and the sensitivity of the most sensitive emulsion is effectively increased.

4. A pair of intensifying screens adapted to be disposed respectively in juxtaposition to the front and back of a photographic color film, said film having blue- and green-sensitized emulsion layers on the front thereof and a red-sensitized emulsion layer on the back thereof, said front screen comprising a base sheet carrying a uniform phosphor coating of a finely ground mixture in the proportion of approximately 20 grams hexagonal zinc sulphide crystals and a trace of metallic colloidal silver and 7.5 grams rhomboidal zinc silicate crystals and a trace of metallic manganese, said back screen comprising a base sheet carrying a uniform phosphor coating of finely ground cadmium borate in the proportion of 12.5 grams and a trace of metallic manganese.

References Cited in the file of this patent
UNITED STATES PATENTS

| | | |
|---|---|---|
| 2,213,437 | Wolf | Sept. 3, 1940 |
| 2,442,961 | Ramberg | June 8, 1948 |
| 2,644,096 | Fine | June 30, 1953 |

OTHER REFERENCES

Luminescence-Pringsheim, 1943 edition, pages 188–189, Interscience Publisher Inc., New York, N. Y.